Dec. 14, 1948.   F. E. JOHNSON   2,456,559
SHIFTABLE ROTARY OPERATIVE FASTENER
Filed Oct. 12, 1944
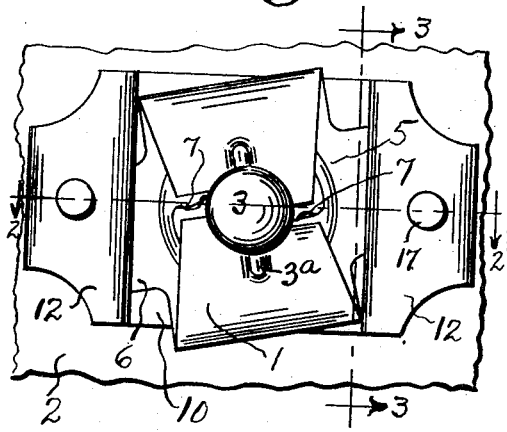
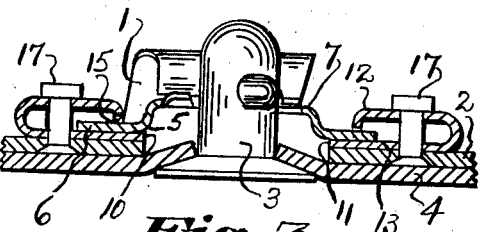
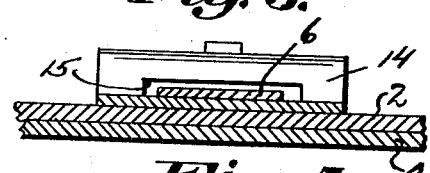
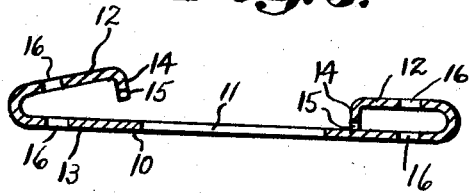
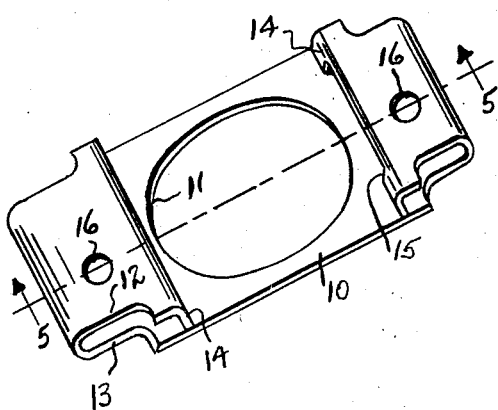
Inventor
Frank E. Johnson.
By Walter S. Jones
Attorney Patented Dec. 14, 1948

2,456,559

UNITED STATES PATENT OFFICE 2,456,559

SHIFTABLE ROTARY OPERATIVE FASTENER

Frank E. Johnson, Malden, Mass., assignor to United-Carr Fastener Corporation, Cambridge, Mass., a corporation of Massachusetts Application October 12, 1944, Serial No. 558,418

4 Claims. (Cl. 24—221)

1

The present invention relates to improvements in rotary operative fasteners such as those employed for connecting together airplane cowling sheets, and aims generally to improve existing fasteners of this type.

More particularly the invention provides a novel and improved mounting for the female fastener part of such fastener whereby the female fastener part may be shiftably mounted relative to an aperture in a support to which it is attached to facilitate the alignment of the female fastener part with the rotary stud member mounted in the part to be attached to the support.

A further object is the provision of a simple and efficient mounting or attaching member which may be formed of a single piece of light weight sheet metal, heat-treated separately from the fastener member yet readily assembled therewith when connecting the attaching member to the support.

Other aims and objects of the invention will be apparent to those persons skilled in the art from a consideration of the accompanying drawings and annexed specification illustrating and describing a preferred form of the invention.

In the drawings:

Fig. 1 is a top plan view of a rotary operative fastener installation embodying the present invention;

Fig. 2 is a longitudinal sectional view thereof taken on the line 2—2 of Fig. 1, the rotary stud member of the fastener being shown in elevation;

Fig. 3 is a transverse sectional view of the fastener as taken on the line 3—3 of Fig. 1;

Fig. 4 is a detail perspective view of the female fastener attaching plate according to one embodiment of the present invention; and Fig. 5 is a longitudinal sectional view of the fastener attaching plate shown in Fig. 4 as taken on the line 5—5 of Fig. 4, the left side being shown in preassembly position and the right showing after assembly position.

Referring more particularly to the drawings, the invention provides new and improved means for shiftably attaching a female socket or fastener member to a suitably apertured support, such as one of the parts of airplane cowling, though it is to be understood that the invention is susceptible of general application and is not restricted to such use.

Rotary operative type fasteners, such as those used for securing airplane cowling sheets together, usually include a female fastener or socket member 1 suitably attached to one side of an apertured supporting sheet 2 and adapted to receive and interlock with a rotary male fastener member 3 rotatably mounted in a part 4 to be secured to the support 2. The rotary male fastener element may be formed with lateral projections such as radial arms 3a, adapted to overlie and be engaged with a locking seat of the female fastener 1 spaced outwardly from the support 2. Upon turning of the rotary male fastener member 3 the lateral projections thereof will engage the seat and thus hold the support 2 and part 4 in rigid fastened relationship.

The female fastener or socket member may be of any approved type and construction to receive and lockingly cooperate with a rotary male element 3. Preferably, it includes a base 5 formed with longitudinal bearing extensions 6 and a centrally apertured outwardly dished seat 7. In the illustrated form the socket member 1 is of the type disclosed and claimed in the prior patent of William A. Bedford, Jr., No. 2,306,928, granted December 29, 1942, to which reference is made for a more complete disclosure of a preferred type of female fastener member.

The invention provides an improved attaching plate for shiftably mounting the female fastener or socket member 1 and for attaching it to its support 2 overlying the aperture thereof. According to the invention the attaching means comprises a substantially flat elongated plate 10 formed of thin sheet metal and having an enlarged central aperture 11, through which the male fastener member 3 on the part 4 to be secured to the support 2, may be passed. The portions of the plate surrounding the aperture 11 provide a slidable bearing surface for the female fastener part 1.

According to one embodiment of the invention, illustrated in Figs. 1 to 5, the opposite end portions of the plate beyond the aperture 11 may be reversely folded to provide spaced inner and outer walls 12 and 13 respectively, the terminal end of the inner wall being inwardly flanged as at 14 providing a spacer for said walls and being transversely notched or slotted as at 15 to receive and retain the bearing extensions 6 of said fastener part 1. The inner and outer walls 12 and 13 are preferably apertured as at 16 intermediate the outer ends of the flanges 14 for the reception of attaching means such as rivets 17 or the like for securing the plate 2 to the support. The inner and outer walls 12 and 13, beyond the flanges 14 may be of reduced width to reduce the weight of the attaching plate and installation.

The spacing between opposed spacer flanges 14 is preferably greater than the base of the socket member 1 so that the latter may be free to float or shift longitudinally on the plate. Similarly the length of the slot or notch 15 of the flanges 14 is greater than the width of the bearing extensions 6, so that the socket may float or shift transversely of the plate 10.

The socket member 1 and the attaching plate 10 may be separately fabricated from suitable sheet metal stock, for example sheet steel, and then separately heat-treated to increase the strength thereof and resistance to distortion under stress. If desired, the respective parts may be plated, prior to assembly, to increase smoothness of the cooperating sliding surfaces.

The attaching plate is preferably initially formed with the reversely bent socket retainer portions 12, obliquely disposed with reference to the surfaces 13, as shown at the left side of Fig. 5. In this position the socket member 1 may be readily assembled with the attaching plate as the plate 10 is to be attached to the support 2, at which time the inner walls 12 are drawn to substantial parallel relation with the outer walls by the application of the rivets 17, as shown at the right side of Fig. 5.

The above described embodiment of the invention is particularly advantageous in that the respective parts may be separately heat-treated and plated prior to assembly and thus may be made from extremely thin and light weight material. Inasmuch as the attaching rivets 17 pass through and engage both the inner and outer walls 12 and 13, adequate strength is provided for the retainer for the bearing extensions adjacent thereto and in the longitudinal plane of extensions where it is most useful.

The invention is not to be restricted to the particular form shown in the drawings which is intended for illustrative purposes only, and the scope of the invention is best defined in the appended claims.

I claim:

1. Attaching means for shiftably attaching a female fastener member of the rotary operative type to an apertured support comprising a plate having a relatively flat centrally apertured body providing a slidable bearing surface for said fastener member, opposed extensions for connecting said plate to a support, and a retainer formed on and as an overlying continuation of each of said extensions adapted to overlie a part of a fastener member, said overlying retainer having lateral spacing means extended toward said plate and providing side-limiting means for limiting lateral shifting of a fastener member on the plate and each of said opposed extensions and the retainer overlying it having cooperating apertures for receiving fastening means for securing said retainer against outward displacement from said extension.

2. Attaching means for shiftably attaching a female fastener member of the rotary operative type to an apertured support comprising a plate having a relatively flat centrally apertured body providing a slidable bearing surface for said fastener member, opposed extensions for connecting said plate to a support, and a retainer formed on and as an overlying continuation of each of said extensions adapted to overlie a part of a fastener member, said overlying retainer having inwardly turned spaced end portions for limiting lateral shifting of a fastener member on said plate and said retainer and the adjacent extension having cooperating apertures for receiving fastening means for securing said retainer against outward displacement from said extension.

3. Attaching means for shiftably attaching a female fastener member of the rotary operative type to an apertured support comprising a plate having a relatively flat centrally apertured body providing a slidable bearing surface for said fastener member, opposed extensions for connecting said plate to a support, and a retainer formed on and as an overlying continuation of each of said extensions adapted to overlie a part of a fastener member, said overlying retainers having inwardly turned transversely slotted terminal ends for receiving parts of a fastener member mounted on said plate, said retainers and said opposed extensions having cooperating fastener-receiving means for securing said retainer against outward displacement from said extension.

4. Attaching means for shiftably attaching a female fastener of the rotary operative type to an apertured support comprising a plate having a relatively flat centrally apertured body providing a slidable bearing surface for said fastener member, opposed extensions for connecting said plate to a support, and a retainer formed on and as an overlying continuation of each of said extensions adapted to overlie a part of a fastener member, lateral spacing means disposed between said retainers and said plate and providing a side-limiting means for limiting lateral shifting of a fastener member on the plate, and said opposed extensions and said retainers having cooperating apertures for receiving fastening means for securing said retainer against outward displacement from said extension.

FRANK E. JOHNSON.

REFERENCES CITED

The following references are of record in the file of this patent:

UNITED STATES PATENTS

| Number | Name | Date |
|---|---|---|
| 2,322,614 | Bedford, Jr. | June 22, 1943 |
| 2,327,331 | Pender | Aug. 17, 1943 |
| 2,407,815 | Churchill | Sept. 27, 1946 |